March 26, 1940.　　　H. C. PARRISH　　　2,194,719

ICE CREAM FREEZER

Filed Oct. 18, 1938

Inventor
H. C. Parrish
By Mason Fenwick & Lawrence
Attorneys

Patented Mar. 26, 1940

2,194,719

UNITED STATES PATENT OFFICE 2,194,719

ICE CREAM FREEZER

Henry C. Parrish, Richmond, Va., assignor to Richmond Cedar Works, Richmond, Va., a corporation of Virginia Application October 18, 1938, Serial No. 235,643

5 Claims. (Cl. 62—114)

This invention relates to improvements in ice cream freezers; and more particularly, structure designed to facilitate freezing and protect the can containing the mix.

In the ordinary freezer, the can containing the mix is surrounded with ice and salt, so that the outside of the can comes in direct contact with the ice. The ice varying in size and shape often makes it very difficult to revolve the can, and if left without turning over a period of time, causes the outside of the can to adhere to the ice. It is also well known that brine, consisting of a mixture of ice water and salt, is much colder than the ice treated with salt. In the usual freezing operation, the can containing the mix contacts the salt-treated ice, the brine collecting at the bottom of the freezer.

The principal object of my invention is to space the salt-treated ice from the can containing the mix by the use of a perforated baffle so that the brine will collect in the space between the baffle and the can, thus exposing the outer surface of the can to the brine solution, eliminating the objectionable friction and increasing freezing temperature of the exterior of the can.

Another object is to reduce the quantity of ice necessary for freezing purposes, and at the same time, shorten the freezing period, with resulting efficiency.

Still another object is to save the wear and deterioration of the can containing the mix. It has been found where the can is in frictional contact with the ice that it quickly wears out.

Other objects of my invention will be disclosed in the specification and claims forming a part hereof.

In the drawing.

Referring to the drawing, in which similar parts are designated with like numerals.

Figure 1:
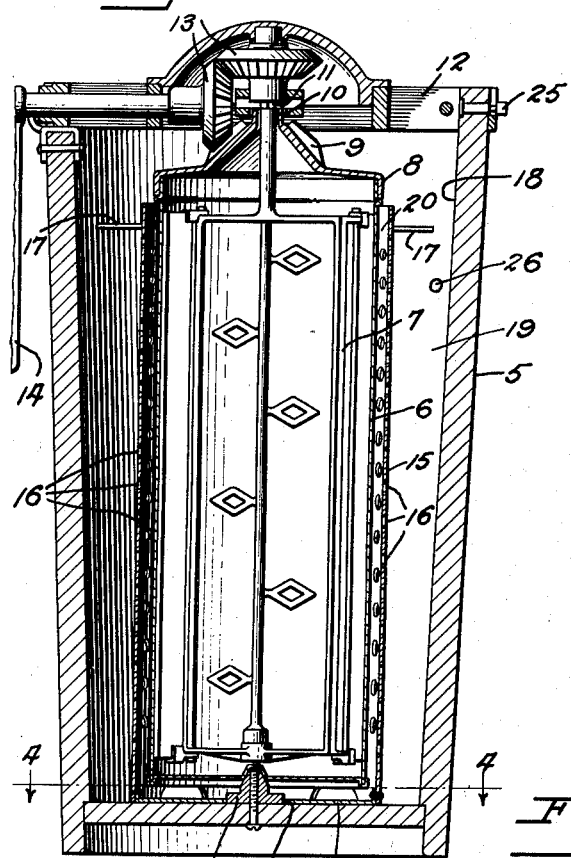
Figure 1 is a vertical section.
Figure 3:
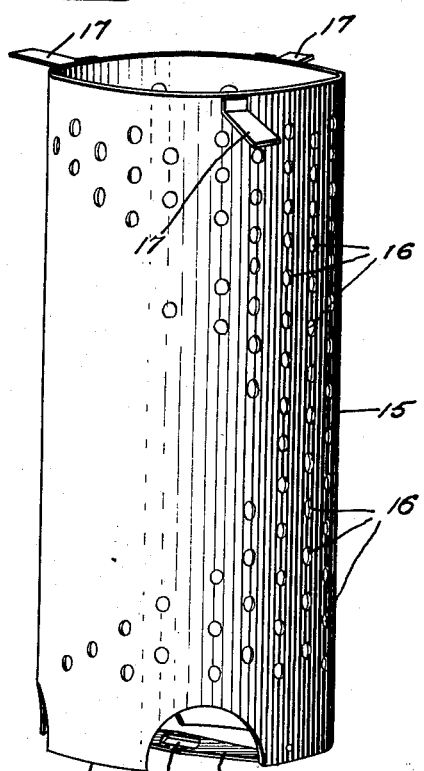
Figure 3 is a perspective of the guard removed from the freezer.
Figure 2:
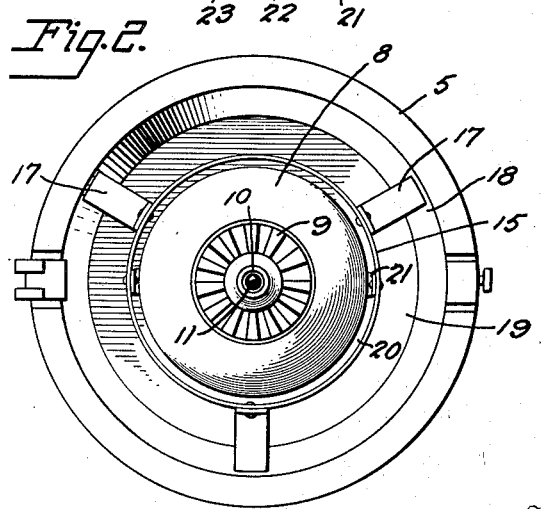
Figure 2 is a top plan.
Figure 4:
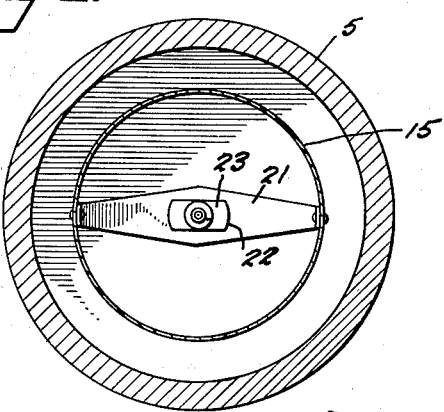
Figure 4 is a horizontal section taken on the line 4—4 of Figure 1.

Numeral 5 designates a freezer of the usual construction having a can 6 to contain a mix with a dasher 7 therein. A cover 8 has gear teeth 9 on its outer periphery, with an aperture 10 through which the stud 11 of the dasher 7 extends. A gear frame 12, having gears 13 of the usual construction, and having a crank 14, is adapted to rotate the dasher 7 and can 6. Surrounding the can 6 is positioned a circular guard or baffle 15, having perforations 16 therein.

Spacer arms 17 secured to the guard 15 extend therefrom and contact the inner walls 18 of the freezer 5, centering the guard 15. The guard 15 forms a reservoir 19 for ice and salt on one side and a brine chamber 20 on the other, the brine seeping through perforations 16 and coming into direct contact with the can 6. It is well known that brine resulting from melting ice and salt is colder than the ice or mixture of salt and ice, and as long as the reservoir 19 is kept filled with ice and salt, the brine will retain a lower temperature. The guard 15 has a strap 21 extending across its bottom, with an opening 22 which fits over the bottom rest 23, thus centering the guard 15. The bottom edge 24 of the guard 15 is cut away to permit the flow of the brine which collects at the bottom of the ice and salt reservoir 19 into the brine chamber 20.

As actually used, the guard 15 is placed in the freezer with the opening 22 in the strap 21 coinciding with the bottom rest 23. The can 6 is then placed within the guard 15 in the usual manner. The ice and salt reservoir 19 is then filled with a mixture of crushed ice and salt, the dasher 7 is placed in the can, and the mix poured in. The cover 8 is then placed on the can, the gear frame 12 positioned and locked by turning knob 25. The freezing operation then commences and is continued until the mixture is frozen and the turning of the crank becomes difficult. Since the can 6 is revolving in brine, there is no frictional wear on the sides of the can and the freezing operation is more rapid since the brine has a lower temperature than the ice and salt.

An opening 26 in the side of the freezer provides an over-flow for the brine. Upon the freezing operation being completed, the knob 25 is unlocked, the gear frame 12 lifted, cover 8 removed, the dasher taken out, the mix smoothed down, cover 8 replaced, and a stopper placed in the top of the cover 8. An additional mixture of salt and ice is then placed in the freezer and over the can.

To facilitate the formation of brine during the early freezing operation, water may be poured over the ice and salt so that the brine chamber will be filled. By this operation the can will be turned in brine from the outset without waiting for the natural melting of the ice.

It is to be noted that the guard 15 is in the form of an accessory which will fit any standard freezer and need not be used unless desired. The strap 21 may be eliminated, in which case, after the freezing operation has been completed, the guard may be removed and the entire space around the can filled with a mixture of crushed ice and salt.

Numerous variations may doubtless be devised by persons skilled in the art without departing from the principles of my invention. I, therefore, desire no limitations to be imposed on my invention, except such as are indicated in the appended claims.

What I claim is:

1. An ice cream freezer accessory comprising a cylindrical guard member having open ends and perforations throughout its walls, a strap member extending across the bottom of the guard and having an opening therein for centering the same in a freezer, arms extending outwardly from the walls of said guard adapted to space the said guard from the inner walls of a freezer, said guard adapted to be placed within the freezer between a can and the freezer walls to space ice and salt from contact with the can.

2. An ice cream freezer comprising a freezer pail, a can for mix within the pail, a perforated guard spaced from the freezer pail and forming a reservoir for ice and salt, means for rotating said can in cold brine passing through the perforations in said guard.

3. An ice cream freezer comprising a freezer pail, a can for mix within the pail, a cylindrical perforated guard member extending from the bottom of the pail to a point adjacent the top thereof and between the inner wall of the pail and the can providing a reservoir for ice and salt on the pail side and a space for brine on the other, and means for rotating said can in the cold brine.

4. An ice cream freezer comprising a freezer pail, a can for mix within the pail, a cylindrical perforated guard member extending from the bottom of the pail to a point adjacent the top thereof and between the inner wall of the pail and the can providing a reservoir for ice and salt on the pail side and a space for brine on the other, means for spacing said guard from the walls of the pail and centering said guard in said pail, and other means for rotating said can in cold brine only.

5. In combination with an ice cream freezer having a pail and an axially disposed can, a partition surrounding said can spaced therefrom defining a brine chamber around said can, and a salt and ice chamber between said partition and pail, said partition being constructed to afford communication between said chambers.

HENRY C. PARRISH.